US008040769B2

(12) United States Patent
Koseki

(10) Patent No.: US 8,040,769 B2
(45) Date of Patent: Oct. 18, 2011

(54) OPTICAL DISC REPRODUCING APPARATUS AND OPERATION METHOD THEREOF

(75) Inventor: Yoichi Koseki, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 435 days.

(21) Appl. No.: 12/285,214

(22) Filed: Sep. 30, 2008

(65) Prior Publication Data

US 2009/0092015 A1 Apr. 9, 2009

(30) Foreign Application Priority Data

Oct. 4, 2007 (JP) ................................ 2007-261152

(51) Int. Cl.
*G11B 7/00* (2006.01)

(52) U.S. Cl. ................................ 369/47.43; 369/47.41

(58) Field of Classification Search ............... 369/47.41, 369/47.43
See application file for complete search history.

(56) References Cited

U.S. PATENT DOCUMENTS

| | | | | |
|---|---|---|---|---|
| 4,481,615 | A * | 11/1984 | Hioki | 369/47.43 |
| 4,611,319 | A * | 9/1986 | Naito | 369/47.45 |
| 5,200,944 | A * | 4/1993 | Souma | 369/47.48 |
| 5,568,467 | A * | 10/1996 | Inagaki et al. | 369/47.43 |
| 5,982,726 | A * | 11/1999 | Ro et al. | 369/47.41 |
| 6,331,967 | B1 * | 12/2001 | Matsui et al. | 369/47.3 |
| 6,556,524 | B1 * | 4/2003 | Takeshita | 369/47.43 |
| 7,020,058 | B2 * | 3/2006 | Yamamoto | 369/47.38 |
| 7,184,379 | B2 * | 2/2007 | Tsukihashi et al. | 369/47.43 |
| 2001/0055253 | A1 * | 12/2001 | Bresit | 369/47.41 |
| 2003/0012101 | A1 * | 1/2003 | Park | 369/47.48 |
| 2006/0227684 | A1 * | 10/2006 | Hsu et al. | 369/47.41 |
| 2009/0092015 | A1 * | 4/2009 | Koseki | 369/47.38 |

FOREIGN PATENT DOCUMENTS

| | | |
|---|---|---|
| JP | 63-29373 A | 2/1988 |
| JP | 2003-242708 A | 8/2003 |

* cited by examiner

*Primary Examiner* — Peter Vincent Agustin
(74) *Attorney, Agent, or Firm* — Foley & Lardner LLP

(57) ABSTRACT

An optical disc reproducing apparatus includes: a decode processing circuit configured to generate decoded data by decoding encoded data read out from an optical disc such that the decoded data is written into a buffer memory, and to output a write signal to indicate a data rate when the decoded data is written in the buffer memory. A data processing circuit converts the decoded data read out from the buffer memory into an output data, and outputs a read signal to indicate a data rate when the decoded data is read out from the buffer memory. An optical disc rotation control circuit controls a number of rotations of the optical disc based on the write signal and the read signal.

7 Claims, 7 Drawing Sheets

FIRST COUNTER
SECOND COUNTER
PHASE DIFFERENCE DATA CALCULATING CIRCUIT
UP-DOWN COUNTER
FIRST CYCLE DIFFERENCE DATA CALCULATING CIRCUIT
FIRST COUNTER VALUE
SECOND COUNTER VALUE
FIRST COUNTER CYCLE SIGNAL
SECOND COUNTER CYCLE SIGNAL
1
12
13
14
15
16
17
23
24
25
71
72
73

(a)
(b)
(c)
(d)
(M−1)∗n
(N−1)∗m
1∗S
0
0∗S
−1∗S
3∗S
2∗S
0 +1 +1 +2 +2 +3 +2 +1 +2 +1 0 +1 0 −1 0 −1
73: CYCLE DIFFERENCE DATA
OPTICAL DISC CYCLE CONTROL DATA 25 = PHASE DIFFERENCE DATA 72
+ CYCLE DIFFERENCE DATA 73

| | CONDITION | COEFFICIENT P |
|---|---|---|
| FIRST CONDITION | -UD1 < UP-DOWN COUNTER VALUE 71 < UD1 | P1 |
| SECOND CONDITION | -UD2 < UP-DOWN COUNTER VALUE 71 ≦ -UD1 | P2 |
| THIRD CONDITION | UD1 ≦ UP-DOWN COUNTER VALUE 71 < UD2 | |
| FOURTH CONDITION | UP-DOWN COUNTER VALUE 71 ≦ -UD2 | P3 |
| FIFTH CONDITION | UD2 ≦ UP-DOWN COUNTER VALUE 71 | |

OPTICAL DISC REPRODUCING APPARATUS AND OPERATION METHOD THEREOF

INCORPORATION BY REFERENCE

This application claims priority on convention based on Japanese Patent Application No. 2007-261152. The disclosure thereof is incorporated herein by reference.

BACKGROUND OF THE INVENTION

1. Field of the Invention

The present invention relates to an optical disc reproducing apparatus.

2. Description of Related Art

A technique for converting analog audio data into digital audio data (hereinafter to be simply referred to as "audio data") has been widely known. Compression techniques which can reduce an amount of audio data are also known. A plurality of standards for generating compressed audio data are known. For example, typical standards include MP3, WMA and AAC.

Along with a progress of information technology, techniques for recording the compressed audio data on an optical information recording medium such as CD-R and DVD-R are widespread. The compressed audio data recorded on the optical information recording medium is converted into analog audio data by an optical disc reproducing apparatus (for example, a CD drive) and then the audio data is outputted from an output unit such as a speaker.

The optical disc reproducing apparatus for the compressed audio data is provided with a buffer memory. The optical disc reproducing apparatus executes processes such as a decoding process on read data read out from the optical information recording medium and held in the buffer memory, and then suppresses such fault that audio data which is being reproduced is suspended.

When data is sequentially transferred from the optical disc reproducing apparatus to a host computer, the data after a decoding operation by a decoding circuit is stored in a buffer if a transfer rate is smaller than a read rate from the optical disc. When the read data is fully written into the buffer memory, a read operation from the optical disc must be brought to a halt until the buffer memory has a room for storage. In the meantime, power may be consumed due to rotation of the optical disc. Thus, a technique of varying rotation speed of the optical disc depending on an amount of data held in the buffer memory is known in Japanese Patent Application Publication (JP-P2003-242708A: conventional example 1).

FIG. 1 is a block diagram showing an information recording disc reproducing apparatus described in the conventional example 1. In the information recording disc reproducing apparatus described in conventional example 1, rotation of the information recording disc 103 is controlled by a DVD-ROM drive 102 and a signal read from the information recording disc 103 is decoded by the DVD-ROM drive 102 and transferred to a host computer 101. The DVD-ROM drive 102 includes a microprocessor 104, a ROM 105, a buffer 106, a reproduction speed control section 107, an information recording disc reading apparatus 108, a decoder 109 and a RAM 110.

According to a program previously stored in the ROM 105 and an instruction issued from the host computer 101, the microprocessor 104 controls other blocks in the DVD-ROM drive 102. Data read out from the information recording disc 103 by the information recording disc reading apparatus 108 is supplied to a decoder 109 and decoded by the decoder 109. The decoded data is sequentially stored in the buffer 106 and, after temporary storage, is transferred to the host computer 101. Depending on a transfer type such as transfer method or transfer mode for a transfer section adapted to transfer data to the host computer 101, a line speed at a reproduction position of the information recording disc 103 is controlled to be highest line speed determined based on a transfer rate of each transfer type or less. By controlling the line speed at the reproduction position of the information recording disc 103 so that a data transfer rate to the host computer 101 does not exceed a data rate at which the decoded data is stored in the buffer 106, a high-speed rotation of the information recording disc 103 is suppressed. When the amount of data stored in the buffer 106 is a predetermined value or more, the buffer 106 is prevented from being fully filled by reducing a rotation speed of the information recording disc 103.

The conventional example 1 describes a technique of an information recording disc reproducing apparatus which varies the rotation speed of the information recording disc 103 depending on a transfer section. The decoder 109 of the information recording disc reproducing apparatus performs a CD decoding process and a CD-ROM decoding process to the CD-ROM disc. Here, when the data recorded on the information recording disc 103 is compressed audio data, the decoder 109 decodes the compressed audio data in addition to the CD decoding process and the CD-ROM decoding process.

When multiple compressed audio data having different data compressibilities are recorded on the information recording disc 103, a decoding process corresponding to the data compressibility is performed. For this reason, the data rate at which the decoded data is stored in the buffer 106 varies depending on the decoding process. That is to say, when the technique described in conventional example 1 is applied to the optical disc reproducing apparatus capable of reproducing the compressed audio data, it may be difficult to determine a data rate in the decoding process. In addition, it may be difficult to determine a line speed in read of the optical disc.

Furthermore, there is a variable bit rate method in which the data compressibility of a part of the compressed audio data is not fixed but variable. When the technique described in conventional example 1 is applied to the optical disc reproducing apparatus capable of reproducing the compressed audio data, it is difficult to cope with variance of a decoded data rate.

Unlike an apparatus in which the line speed of the optical disc can be calculated by an external transfer section, the line speed of the optical disc which stores the compressed audio data cannot be previously known. Thus, conventional systems cannot rotate at a low speed and control the optical disc which stores the compressed audio data. There is a conventional method of monitoring the number of stages of FIFO and performing a phase comparison of data write/read into/from a buffer memory. However, when data rates of data write/read into/from the buffer memory are different or the data rate is extremely low, there is no technique for coping with such a state.

SUMMARY

In an aspect of the present invention, an optical disc reproducing apparatus includes: a decode processing circuit configured to generate decoded data by decoding encoded data read out from an optical disc such that the decoded data is written into a buffer memory, and to output a write signal to indicate a data rate when the decoded data is written in the buffer memory; a data processing circuit configured to convert the decoded data read out from the buffer memory into an output data, and to output a read signal to indicate a data rate when the decoded data is read out from the buffer memory; and an optical disc rotation control circuit configured to control a number of rotations of the optical disc based on the write signal and the read signal.

In another aspect of the present invention, an operation method of an optical disc reproducing apparatus, includes: generating decoded data by decoding encoded data read out from an optical disc such that the decoded data is written into a buffer memory; generating a write signal to indicate a data rate when the decoded data is written in the buffer memory; converting the decoded data read out from the buffer memory into an output data; generating a read signal to indicate a data rate when the decoded data is read out from the buffer memory; and controlling a number of rotations of the optical disc based on the write signal and the read signal.

In another aspect of the present invention, an operation method of an optical disc reproducing apparatus, which includes: a decode processing circuit configured to generate decoded data by decoding encoded data read out from an optical disc to supply the decoded data into a buffer memory; a data processing circuit configured to convert the decoded data read out from the buffer memory into an output data; and an optical disc rotation control circuit configured to control a number of rotations of the optical disc, the operation method includes: the decode processing circuit generating a write signal to indicate a data rate when the writes the decoded data is written in the buffer memory; the data processing circuit generating a read signal to indicate a data rate when the decoded data is read out from the buffer memory; and the optical disc rotation control circuit controlling a number of rotations of the optical disc based on the write signal and the read signal.

When the compressed decoded data is outputted, the data rate at which the compressed data is read from the buffer memory is low. In the present invention, the rotation of the optical disc is made low due to the low data rate so that the buffer memory is not be fully filled.

When data obtained by decompressing the compressed audio data is outputted, the data rate at which data is outputted from the buffer memory lowers according to the data compressibility of the compressed audio data. In the present invention, the disc is rotated at a low speed so that a data input rate to the buffer memory is made lower in correspondence to a lower data output rate from the buffer memory. For example, in case of the disc in which the compressed audio data in compressibility of 1/10 has been recorded, the rotation speed can be made 1/10 of normal reproduction.

By varying the rotation speed of the disc continuously (in a small update interval) in a small step (a small change), an out-of-lock in the PLL circuit for generating a bit clock signal from an EFM signal can be prevented and an error rate during a variation in rotation of the disc can be reduced.

Further, in the reproduction of the compressed audio data, a frequency of access to the buffer memory is decreased. In addition, a time interval of monitoring and update of the disc rotation control is reduced.

Furthermore, by preventing overflow/underflow, re-access to the disc is reduced, thereby reducing loads imposed on the CPU. In addition, since the disc rotation control is not performed by the microprocessor, loads imposed on the microprocessor can be advantageously reduced.

BRIEF DESCRIPTION OF THE DRAWINGS

The above and other objects, advantages and features of the present invention will be more apparent from the following description of certain embodiments taken in conjunction with the accompanying drawings, in which.

DESCRIPTION OF THE PREFERRED EMBODIMENTS

Hereinafter, an optical disc reproducing apparatus of the present invention will be described in detail with reference to the attached drawings. In the following description, a case will be described that a transfer method is PIO transfer or multi-word DMA transfer. Also, the description will be carried out in accordance with a case that a transfer mode indicates a transfer rate determined for each transfer method. Thus, for example, in case of the multi-word DMA transfer,
in a mode 0, the transfer rate is about 4.16 [MB/s],
in a mode 1, the transfer rate is about 13.33 [MB/s], and
in a mode 2, the transfer rate is about 16.67 [MB/s].

First Embodiment

Figure 1:
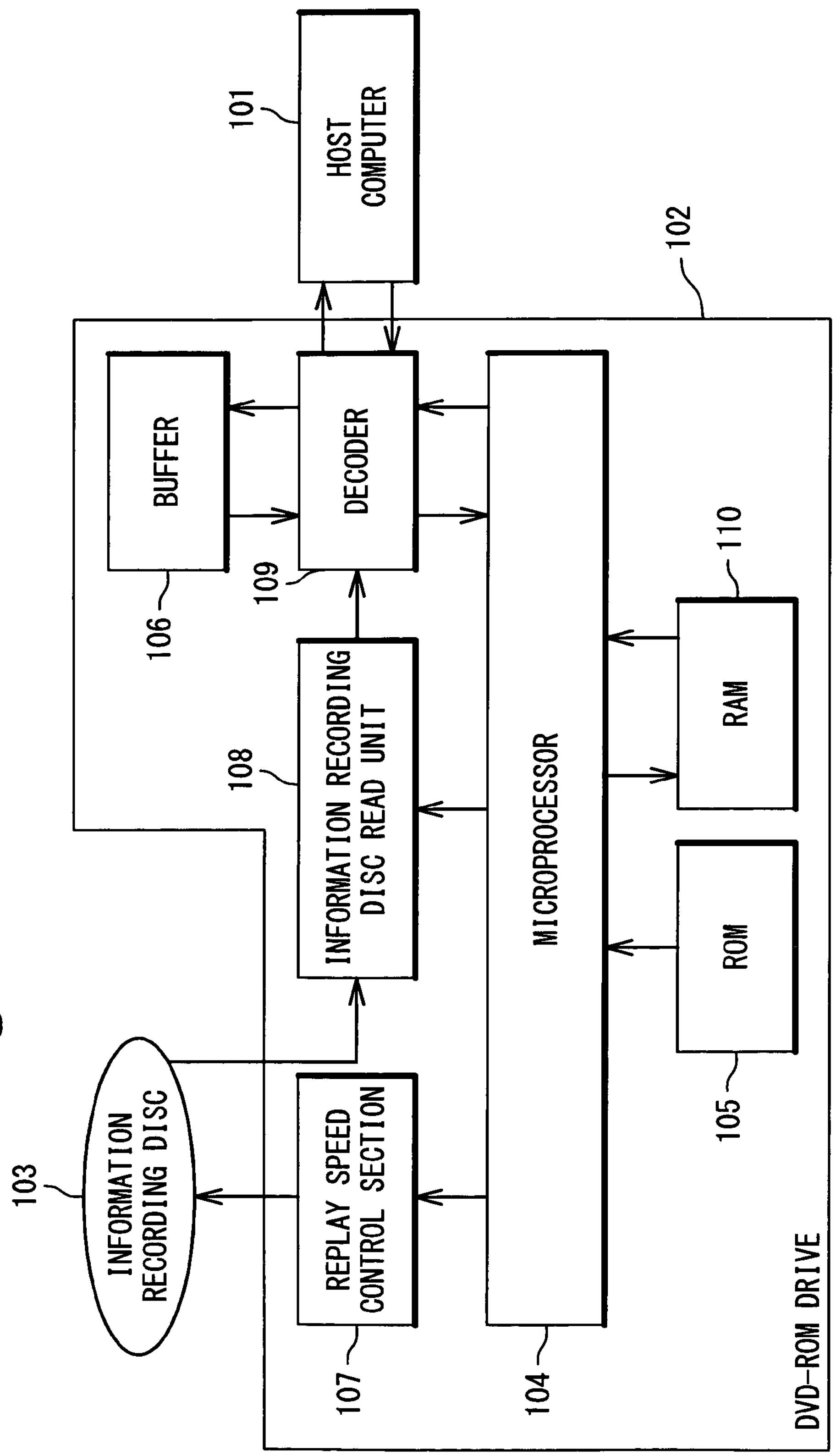
FIG. 1 is a block diagram showing a configuration of a conventional information recording disc reproducing apparatus.
Figure 2:
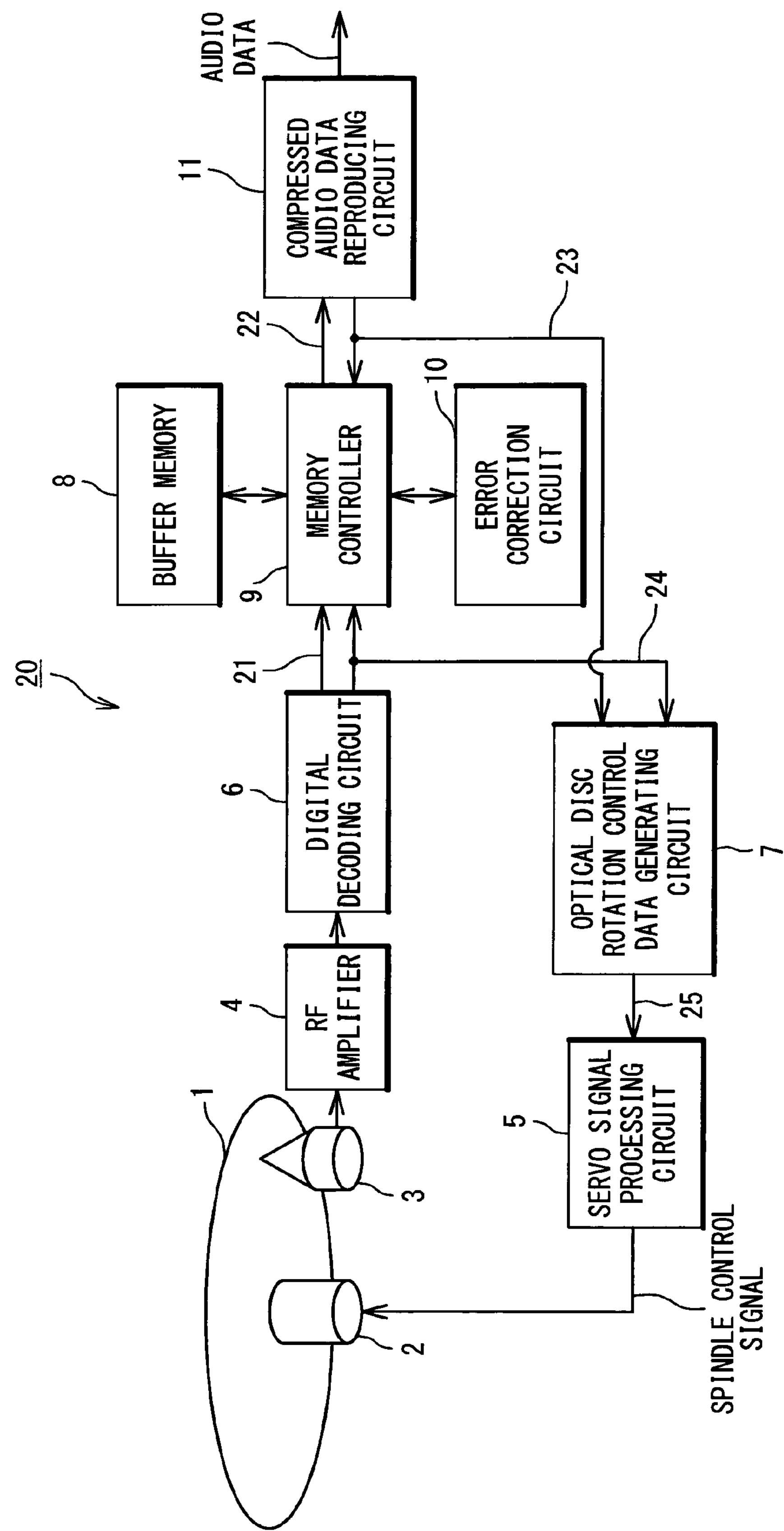
FIG. 2 is a block diagram showing a configuration of an optical disc reproducing apparatus according to a first embodiment of the present invention.

FIG. 2 is a block diagram showing a configuration of an optical disc reproducing apparatus 20 according to a first embodiment of the present invention. An optical disc 1 is mounted on or taken out from the optical disc reproducing apparatus 20. The optical disc 1 is, for example, a CD-ROM, a DVD-ROM, a rewritable CD-R/RW or DVD-R/RW or the like.

The optical disc reproducing apparatus 20 includes a spindle motor 2, an optical pickup 3, an RF amplifier 4, a servo signal processing circuit 5, a digital decoding circuit 6, an optical disc rotation control data generating circuit 7, a buffer memory 8, a memory controller 9, an error correction circuit 10 and a compressed audio data reproducing circuit 11.

The spindle motor 2 rotates the optical disc 1. The spindle motor 2 changes the rotation speed of the optical disc 1 in response to a spindle control signal. The optical pickup 3 includes a semiconductor laser (not shown) and a photodetector (not shown). The optical pickup 3 reads data recorded on the optical disc 1 and outputs the data in the form of an electrical signal. The RF amplifier 4 amplifies the electrical signal outputted from the optical pickup 3 and outputs an EFM (eight to fourteen modulation) signal to the digital decoding circuit 6. The digital decoding circuit 6 decodes the EFM signal outputted from the RF amplifier 4 into a digital data and outputs as a write decoded data 21 to the memory controller 9. The digital decoding circuit 6 outputs a write signal 24 to the memory controller 9 and the optical disc rotation control data generating circuit 7. The write signal 24 is a signal for allowing the memory controller 9 to store the write decoded data 21 in the buffer memory 8.

The memory controller 9 controls an access to the buffer memory 8. The memory controller 9 stores the write decoded data 21 as write data in the buffer memory 8 in response to the write signal 24 outputted from the digital decoding circuit 6. The memory controller 9 reads the stored data as read data from the buffer memory 8 in response to a read signal 23 outputted from the compressed audio data reproducing circuit 11 and supplies the read data as read decoded data 22 to the compressed audio data reproducing circuit 11.

The error correction circuit 10 performs a CRC error check to the write decoded data 21 supplied to the memory controller 9. When an error is found in the write decoded data 21, the error correction circuit 10 corrects the error of the write decoded data 21. The memory controller 9 may read the data stored in the buffer memory 8 in response to a request of the error correction circuit 10.

The compressed audio data reproducing circuit 11 outputs the read signal 23 to the memory controller 9 and receives the read decoded data 22 as read data from the buffer memory 8. The compressed audio data reproducing circuit 11 decodes the compressed audio data and outputs the decoded data as audio data. It should be noted that in the present embodiment, the optical disc rotation control data generating circuit 7 generates optical disc rotation control data 25 in response to the read signal 23 and the write signal 24. The control data generating circuit 7 outputs the optical disc rotation control data 25 to the servo signal processing circuit 5. The servo signal processing circuit 5 outputs a spindle control signal to the spindle motor 2 in response to the optical disc rotation control data 25. The spindle motor 2 controls a rotation speed of the optical disc 1 in response to the spindle control signal.

Figure 3:
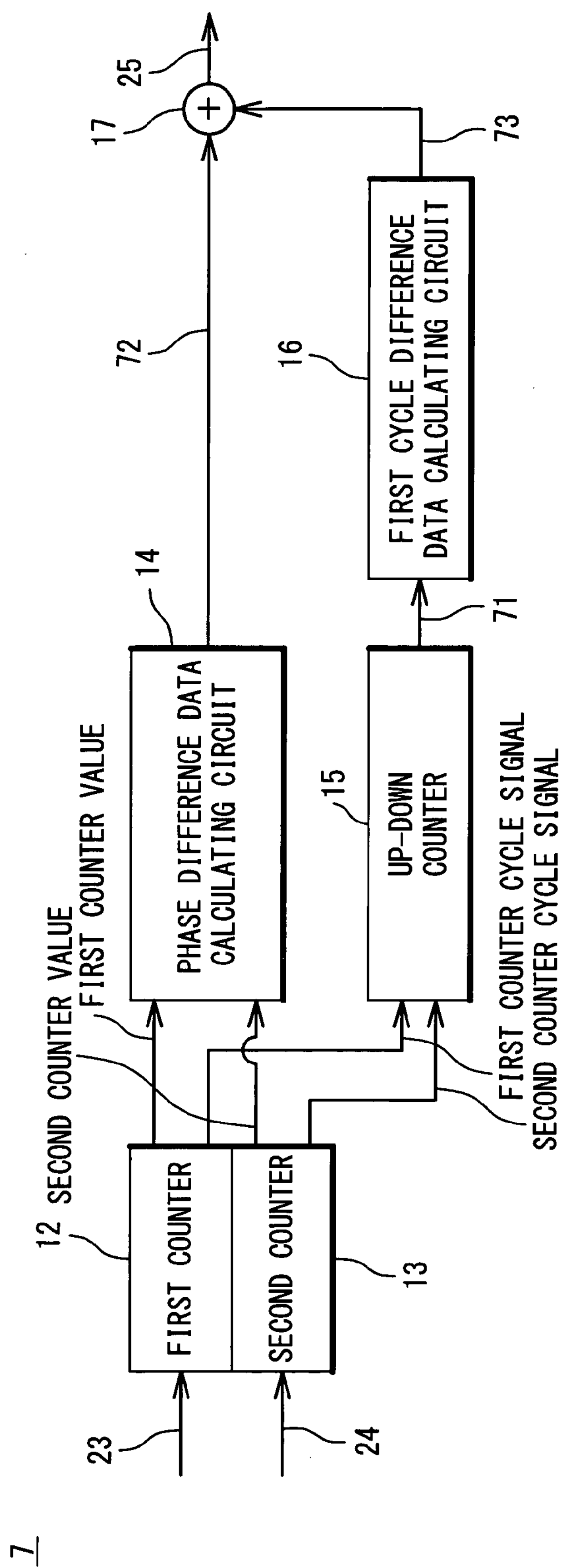
FIG. 3 is a block diagram showing a configuration of an optical disc rotation control data generating circuit in the first embodiment.

FIG. 3 is a block diagram showing a configuration of the optical disc rotation control data generating circuit 7. The control data generating circuit 7 includes a first counter 12, a second counter 13, a phase difference data calculating circuit 14, an UP-DOWN counter 15, a first cycle difference data calculating circuit 16 and an adding circuit 17. The write signal 24 is supplied from the above-mentioned digital decoding circuit 6 to the control data generating circuit 7 and to the memory controller 9. The read signal 23 is supplied from the compressed audio data reproducing circuit 11 to the control data generating circuit 7 and the memory controller 9.

The first counter 12 counts the read signal 23 from 0 to a first counter maximum value (N−1) (N is a constant inherent in system), and outputs a first counter value n as the count value. An operation in which the first counter 12 counts from 0 to the first counter maximum value (N−1) is supposed to be one cycle. The first counter 12 returns the first counter value n to 0 after to the first counter maximum value (N−1), and continues the counting operation in a new cycle. The first counter 12 generates a first counter cycle signal in the form of pulse at transition from the first counter maximum value (N−1) to 0.

The second counter 13 counts the write signal 24 from 0 to a second counter maximum value (M−1) (M is a constant inherent in system) and the count value is a second counter value m. The second counter 13 returns the second counter value m to 0 after the second counter maximum value (M−1), and continues the counting operation in a new cycle. The second counter 13 generates a second counter cycle signal in the form of pulse at transition from the second counter maximum value (M−1) to 0.

The first counter value n of the first counter 12 and the second counter value m of the second counter 13 are supplied to the phase difference data calculating circuit 14. The phase difference data calculating circuit 14 performs a following calculation:

$$\text{Phase difference data } 72=(M-1)\times n-(N-1)\times m$$

The calculating circuit 14 outputs the phase difference data 72.

The first counter cycle signal of the first counter 12 and the second counter cycle signal of the second counter 13 are supplied to the UP-DOWN counter 15. The UP-DOWN counter 15 is incremented in response to the first counter cycle signal from the first counter 12 and decremented in response to the second counter cycle signal from the second counter 13. The count value of the UP-DOWN counter 15 is supplied to the first cycle difference data calculating circuit 16. The difference data calculating circuit 16 performs the following calculation:

$$\text{Cycle difference data } 73=(\text{UP-DOWN counter value } 71)\times(\text{second counter maximum value } (M-1))\times(\text{first counter maximum value } (N-1))$$

The difference data calculating circuit 16 outputs the cycle difference data 73 to the adding circuit 17. Based on the phase difference data 72 and the cycle difference data 73, the adding circuit 17 performs the following calculation:

$$\text{Optical disc rotation control data } 25=(\text{phase difference data } 72)+(\text{cycle difference data } 73)$$

The adding circuit 17 outputs the optical disc rotation control data 25.

When the write decoded data 21 is CD-ROM data and a SYNC pattern of a CD-ROM format is detected and the data amount of 98×24=2352 bytes is recognized as a one sector length of the CD-ROM data, when the data 21 is stored in the buffer memory 8 via the memory controller 9. 2368 bytes, which is a sum of 2340 bytes obtained by subtracting 12 bytes of the sync pattern from the sector data and subcode data subjected to a CIRC decoding process in addition to digital decoding process of disc data in the digital decoding circuit 6, is stored in the buffer memory 8 as data of one sector.

The compressed audio data stored in the buffer memory 8 as CD-ROM data is read from the buffer memory 8 via the memory controller 9 as the read decoded data 22 in response to the read signal 23 from the compressed audio data reproducing circuit 11. However, a parity portion used for error correction in the CD-ROM error correction circuit 10 is unnecessary, and 2048 bytes per sector are read by the compressed audio data reproducing circuit 11 as the read decoded data 22. That is, for data which is written into the buffer memory 8 as the write decoded data 21 and read from the buffer memory 8 as the read decoded data 22 in an actual system, the number of write data per sector is 2368 bytes, and the number of read data per sector is 2048 bytes.

Given that a common divisor L exists, $$2368(940H)=L\times M \text{ and}$$

$$2048(800H)=L\times N,$$

$$L=64(40H), \text{ and } M=37(25H), N=32(20H) \text{ are obtained.}$$

The optical disc rotation control data generating circuit 7 normalizes the first counter value n of the first counter 12 and the second counter value m of the second counter 13 based on the maximum values N−1 and M−1, respectively, such that the maximum values are "1". The control data generating circuit 7 controls rotation of the optical disc 1 so that the first counter value n/first counter maximum value (N−1) may be equal to the second counter value m/second counter maximum value (M−1) in phase and period.

The phase difference can be obtained from the following calculation:

phase difference=first counter value n/first counter maximum value (N−1)−the second counter value m/second counter maximum value (M−1) (Maximum value: 1)

Meanwhile, a cycle difference can be obtained as a value of the UP-DOWN counter 15 which is incremented by 1 in case of one cycle of the first counter value n of the first counter 12 and is decremented by 1 in case of one cycle of the second counter value m of the second counter 13. Rotation of the disc is controlled so that a sum of the phase difference and the cycle difference may become 0.

In an actual circuit, from the following calculations:

phase difference data 72=second counter maximum value $(M-1)\times n-$first counter maximum value $(N-1)\times m$, maximum value=second counter maximum value $(M-1)\times$first counter maximum value $(N-1)$, and minimum value: $-1\times$second counter maximum value $(M-1)\times$first counter maximum value $(N-1)$, the phase difference data calculating circuit 14 performs the above phase difference operation to output the phase difference data 72. Here, Constant $S$=second counter maximum value $(M-1)\times$ first counter maximum value $(N-1)$, the maximum value of the phase difference data 72 is 1×S and the minimum value of the phase difference data 72 is −1×S. The UP-DOWN count value 71 of the UP-DOWN counter 15 is multiplied by second counter maximum value (M−1)×first counter maximum value (N−1)=S to obtain the cycle difference data 73. The first cycle difference data calculating circuit 16 performs this cycle difference data operation:

$$\begin{aligned}\text{Cycle difference data 73} &= \text{UP-DOWN count value 71}\times\\&\quad\text{second counter maximum value}\\&\quad(M-1)\times\text{first counter maximum}\\&\quad\text{value }(N-1)\\&=\text{UP-DOWN count value 71}\times S\end{aligned}$$

to output the cycle difference data 73. The phase difference data 72 as an output of the phase difference data calculating circuit 14 is added to the cycle difference data 73 as an output of the first cycle difference data calculating circuit 16 by the adding circuit 17 to find the optical disc rotation control data 25.

Optical disc rotation control data 25=phase difference data 72+cycle difference data 73

Rotation of the optical disc 1 is controlled so that the optical disc rotation control data 25 may be 0, that is, a sum of phase difference and cycle difference of write/read data into/from the buffer memory 8. Calculation of the phase difference data 72, the cycle difference data 73 and the optical disc rotation control data 25 may be performed at any fixed cycle. Generally, it is desired that the cycle is the same as an update cycle of the spindle control signal in servo signal processing.

Figure 4:
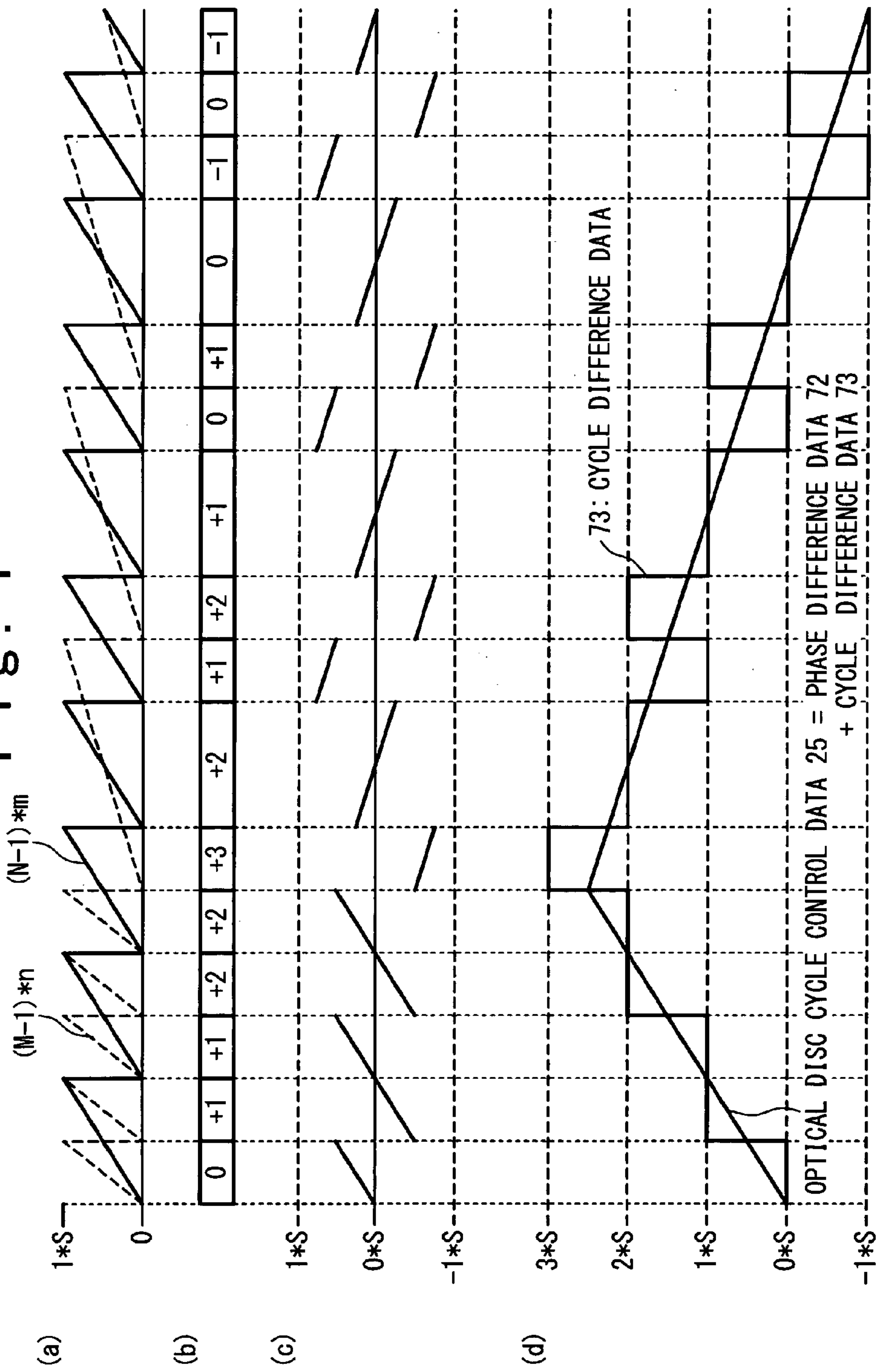
FIG. 4 shows timing charts in an operation of the optical disc rotation control data generating circuit in the first embodiment.

FIG. 4 is timing charts showing an operation of the optical disc rotation control data generating circuit 7. A horizontal axis in FIG. 4 represents time course. A portion (a) of FIG. 4 shows time variation of the product of the first counter value n and a second counter maximum value (M−1) M−1 in response to the read signal 23 and a product of the second counter value m and a first counter maximum value (N−1) N−1 in response to the write signal 24. The portion (a) of FIG. 4 shows a case that the first counter value n in response to the read signal 23 and the second counter value m in response to the write signal 24 are incremented at different data rates.

The portion (a) of FIG. 4 shows a first operation result a1=second counter maximum value (M−1)×n as a dotted line and a second operation result a2=first counter maximum value (N−1)×m as a solid line. A portion (b) of FIG. 4 shows a time variation of the UP-DOWN count value 71. The portion (b) of FIG. 4 shows an output of the UP-DOWN counter 15 with respect to the first operation result a1 and the second operation result a2. A portion (c) of FIG. 4 shows time variation of the UP-DOWN count value 71. The phase difference data 72 shown in the portion (c) of FIG. 4 is an output of the phase difference data calculating circuit 14 and represents the difference between the first operation result a1 and the second operation result a2. A portion (d) of FIG. 4 shows time variation of the cycle difference data 73. The portion (d) of FIG. 4 also shows time variation of the optical disc rotation control data 25. The cycle difference data 73 shown in the portion (d) of FIG. 4 is an output of the first cycle difference data calculating circuit 16 with respect to the UP-DOWN count value 71 shown in the portion (b) of FIG. 4. The optical disc rotation control data 25 shown in the portion (d) of FIG. 4 is an output of the adding circuit 17 which is obtained by adding the phase difference data 72 to the cycle difference data 73 in the portion (c) of FIG. 4. A time axis thereof is common in the above-mentioned portions (a) to (d) of FIG. 4.

In the portion (a) of FIG. 4, inclinations of the first operation result a1 and the second operation result a2 represent data rates of the read signal and the write signal, respectively. Although the data rate of the first operation result a1 is initially greater than that of the second operation result a2, the data rate of the first operation result a1 becomes smaller than that of the second operation result a2 on the way.

In case of the first operation result a1>the second operation result a2 in the data rate, since the phase difference data 72 is the first operation result a1−the second operation result a2, it has an increasing positive inclination. When the frequency of the first counter cycle signal of the first counter 12 is higher than that of the second counter cycle signal of the second counter 13, the UP-DOWN count value 71 in the portion (b) of FIG. 4 is incremented.

In case of the first operation result a1<the second operation result a2 in the data rate, since the phase difference data 72 is the first operation result a1−second operation result a2, it has a decreasing negative inclination. When the frequency of the second counter cycle signal of the second counter 13 is higher than that of the first counter cycle signal of the first counter 12, the UP-DOWN count value 71 in the portion (b) of FIG. 4 is decremented.

In case of the first operation result a1>the second operation result a2 in the data rate, the optical disc rotation control data 25 has an increasing positive inclination, and in case of the first operation result a1<the second operation result a2 in the data rate, the optical disc rotation control data 25 has a decreasing negative inclination.

It is considered that, when the state of the first operation result a1>the second operation result a2 in data rate continues, the optical disc rotation control data 25 in the portion (d)

of FIG. 4 moves toward a positive value, and when the state of the first operation result a1<the second operation result a2 continues, the optical disc rotation control data 25 in the portion (d) of FIG. 4 moves toward a negative value. That is, as the data rate of the read signal is increased, a positive value of the optical disc rotation control data 25 becomes greater, and as the data rate of the write signal is increased, a negative value of the optical disc rotation control data 25 becomes greater.

It is assumed that, when the value of the spindle control signal outputted from the servo signal processing circuit 5 to the spindle motor 2 is 0, the spindle motor 2 is in a stopped state and then, as the value of the spindle control signal is greater, the spindle motor 2 rotates at a higher speed.

It is assumed that, when the value of the optical disc rotation control data 25 as the output of the optical disc rotation control data generating circuit 7 is 0, the spindle control signal outputted from the servo signal processing circuit 5 to the spindle motor 2 has an offset value for rotating the optical disc 1 at a fixed speed. In the servo signal processing circuit 5, the value of the optical disc rotation control data 25 is added to the offset value to output the spindle control signal.

When the data rate of the read signal is greater than that of the write signal, a positive value is outputted as the optical disc rotation control data 25, and accordingly, the servo signal processing circuit 5 receives the positive value and outputs a spindle control signal to allow the spindle motor 2 to rotate at a higher speed. Contrarily, when the data rate of the write signal is greater than that of the read signal, a negative value is outputted as the optical disc rotation control data 25, and accordingly, the servo signal processing circuit 5 receives the negative value and outputs a spindle control signal below the offset value, to allow the spindle motor 2 to rotate at a lower speed.

When the data rate of the read signal 23 is greater than that of the write signal 24, the frequency at which the decoded data stored in the buffer memory 8 is read out as the read decoded data 22 is high, and the decoded data stored in the buffer memory 8 continues to decrease. In the present embodiment, when the data rate of the read signal 23 is greater than that of the write signal 24, the following relation in the data rate: the first operation result a1>the second operation result a2 in FIG. 4 is established. Thus, the optical disc rotation control data 25 of the optical disc rotation control data generating circuit 7 moves toward a positive value, and accordingly, the servo signal processing circuit 5 receives the positive value and outputs the spindle control signal to allow the spindle motor 2 to rotate at a higher speed. Thus, the rotation speed of the optical disc 1 is increased to increase the write data 21 as write decoded data 21 and the data rate of the write signal 24. That is, when the data rate of the write signal 24 is smaller than that of the read signal 23, the rotation speed of the optical disc 1 is increased, thereby preventing decoded data stored in the buffer memory 8 from continuously decreasing. Similarly, when the data rate of the write signal 24 is larger than that of the read signal 23, the frequency at which the decoded data stored in the buffer memory 8 is written as the write decoded data 21 is high, and thus, the decoded data stored in the buffer memory 8 continues to increase.

In the present embodiment, when the data rate of the write signal 24 is larger than that of the read signal 23, the following relation in data rate: first operation result a1<second operation result a2 is satisfied in FIG. 4. Consequently, the optical disc rotation control data 25 of the optical disc rotation control data generating circuit 7, moves toward a negative value, and accordingly, the servo signal processing circuit 5 receives the negative value and outputs the spindle control signal to allow the spindle motor 2 to rotate at a lower speed. Thereby, the rotation speed of the optical disc 1 is decreased to decrease write data as the write decoded data 21 and the data rate of the write signal 24. That is, when the data rate of the write signal 24 is larger than that of the read signal 23, the rotation speed of the optical disc 1 is decreased, thereby preventing the decoded data stored in the buffer memory 8 from continuously increasing.

To enhance understanding of the operation in the present embodiment, in FIG. 4, the phase difference data 72, the cycle difference data 73 and the optical disc rotation control data 25 are shown as continuous waveform. These waveforms do not limit an operation of the optical disc reproducing apparatus 20 in the present embodiment. It is preferred to perform calculation at the update timing of the optical disc rotation control data 25.

Second Embodiment

Figure 5:
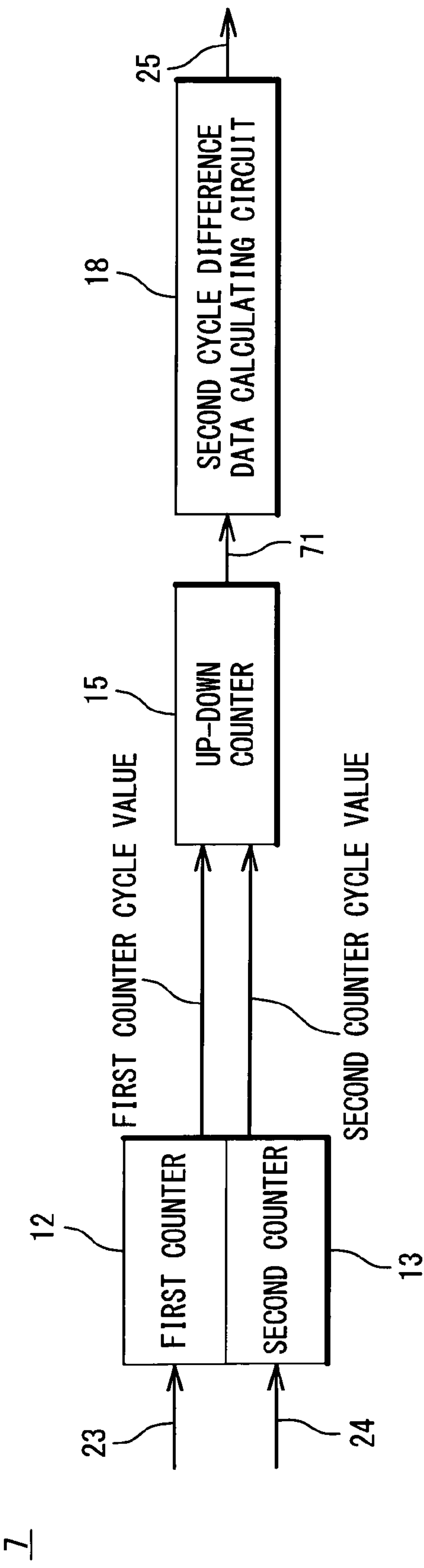
FIG. 5 is a block diagram showing a configuration of the optical disc rotation control data generating circuit of the optical disc reproducing apparatus according to a second embodiment of the present invention.

Hereinafter, the optical disc reproducing apparatus according to a second embodiment of the present invention will be described. FIG. 5 is a block diagram showing a configuration of the optical disc rotation control data generating circuit 7 in the second embodiment of the present invention. The control data generating circuit 7 in the second embodiment generates the optical disc rotation control data 25 without performing the phase difference data calculation. Referring to FIG. 5, the control data generating circuit 7 in the second embodiment includes the first counter 12, the second counter 13, the UP-DOWN counter 15 and a second cycle difference data calculating circuit 18.

As in the first embodiment, the read signal 23 is outputted from the compressed audio data reproducing circuit 11 to the memory controller 9. The memory controller 9 outputs data stored in the buffer memory 8 as the read decoded data 22 in response to the read signal 23, and supplies the data to the compressed audio data reproducing circuit 11.

As in the first embodiment, the write signal 24 is outputted from the digital decoding circuit 6 to the memory controller 9. The memory controller 9 stores the write decoded data 21 outputted from the digital decoding circuit 6 in the buffer memory 8 in response to the write signal 24. The first counter 12, the second counter 13 and the UP-DOWN counter 15 have a same configuration and operation as those in the first embodiment. As shown in FIG. 5, the first counter cycle signal as an output of the first counter 12 and the second counter cycle signal as an output of the second counter 13 are supplied to the UP-DOWN counter 15. The UP-DOWN counter value 71 as the output of the UP-DOWN counter 15 is supplied to the second cycle difference data calculating circuit 18. The second cycle difference data calculating circuit 18 outputs the optical disc rotation control data 25 based on the UP-DOWN counter value 71. The second cycle difference data calculating circuit 18 in the second embodiment multiplies the UP-DOWN counter value 71 by a coefficient P and generates the optical disc rotation control data 25.

Figure 6:
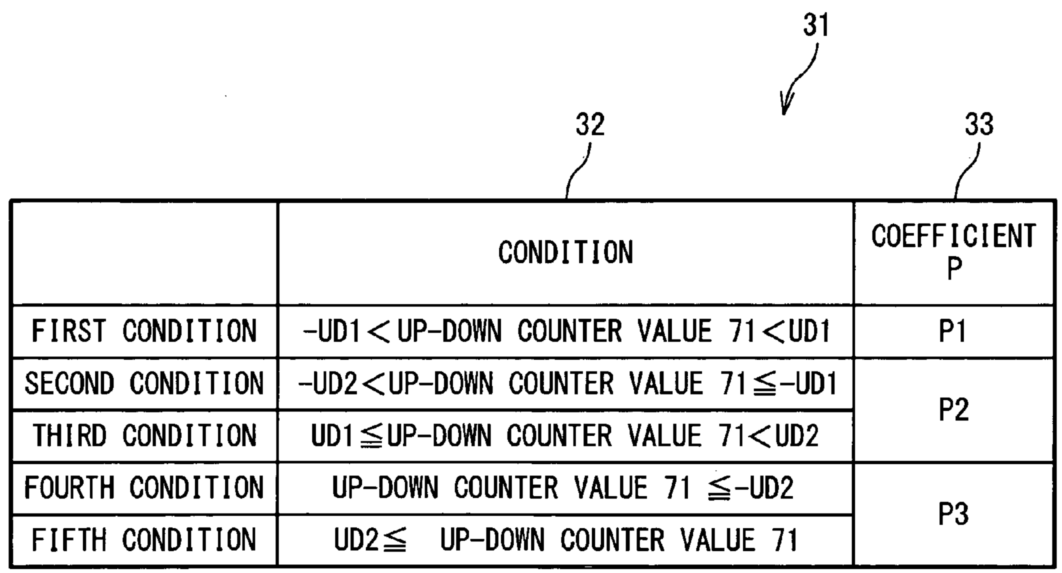
FIG. 6 is a table showing a correspondence of a coefficient P and a condition.

FIG. 6 is a table showing a relation of the coefficient P and a condition (hereinafter to be referred to as a correspondence table 31). The correspondence table 31 includes a condition region 32 and a coefficient region 33. The coefficient P takes any of values of P1, P2 and P3 depending on the UP-DOWN counter value 71 as the output of the UP-DOWN counter 15. It should be noted that the following relation of P1<P2<P3 is maintained. Referring to FIG. 6, in case of $-UD1<$UP-DOWN counter value $71<UD1$,
the coefficient $P=P1$, in case of $-UD2 \leqq$ UP-DOWN counter value $71 \leqq -UD1$, the coefficient $P=P2$, in case of $UD1<$ UP-DOWN counter value $71 \leqq UD2$, the coefficient $P=P2$, in case of UP-DOWN counter value $71<-UD2$, the coefficient $P=P3$, and in case of $UD2 \leqq$ UP-DOWN counter value 71, the coefficient $P=P3$.

Figure 7:
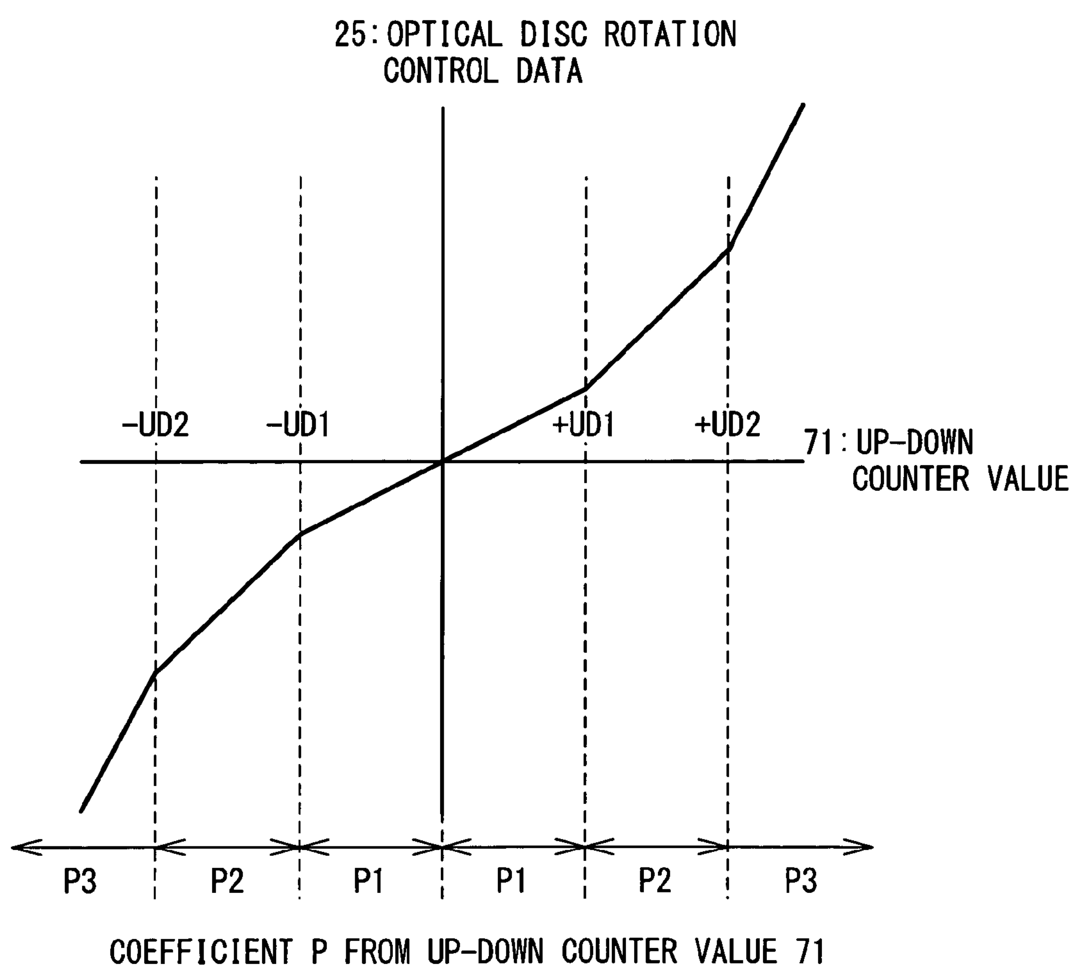
FIG. 7 is a view showing a relation of optical disc rotation control data and an UP-DOWN count value in the second embodiment.

FIG. 7 is a graph showing a characteristic of the optical disc rotation control data 25—the UP-DOWN counter value 71 in the second embodiment. In FIG. 7, a horizontal axis represents the UP-DOWN counter value 71 as the output of the UP-DOWN counter 15, and a vertical axis represents the optical disc rotation control data 25 as the output of the optical disc rotation control data generating circuit 7.

When an absolute value of the UP-DOWN counter value 71 is large, that is, the cycle difference between write and read of data into and from the buffer memory 8 is large, there is a possibility that a data amount in the buffer memory 8 varies more than a predetermined amount, leading to overflow or underflow of the buffer. The optical disc rotation control data generating circuit 7 in the second embodiment prevents the above-mentioned possibility by taking the value of the coefficient P large, thereby increasing variation in the optical disc rotation control data 25, in turn, and the amount of correction of an optical disc rotation control.

When the absolute value of the UP-DOWN counter value 71 is small, that is, a variation in the amount of data in the buffer memory 8 is small, the optical disc rotation control data generating circuit 7 in the second embodiment makes the coefficient P small, thereby decreasing the variation in the optical disc rotation control data 25, in turn, the amount of correction of the optical disc rotation control. Thereby, since the variation in the rotation of the optical disc 1 is decreased, an amount of jitter of a bit clock generated in a PLL circuit is also decreased, reducing an error rate in the decoding process.

A gain to the variation in the amount of data stored in the buffer memory 8 is assumed to be non-uniform, and when the variation in the data amount is large, the possibility of overflow/underflow of the buffer is rapidly avoided by increasing the gain, and when the variation in the data amount is small, the variation in the rotation of the optical disc 1 is decreased by decreasing the gain to lower an error rate in the decoding process.

When an update cycle of the optical disc rotation control data 25 is sufficiently larger than cycles of the first counter 12 and the second counter 13 and cycle difference data rather than phase difference data dominantly contributes to the optical disc rotation control data 25, it is preferred to apply the configuration in the second embodiment. Furthermore, the cycle difference data calculation based on the coefficient P which varies depending on the value of the UP-DOWN counter 15 in the second embodiment may be used also in the first embodiment. The coefficient P which varies depending on a value of the UP-DOWN counter 15 is not limited to P1, P2 and P3.

In the above embodiments, timing when the phase difference data 72 and the cycle difference data 73 are updated may be a time when the write signal 24 or the read signal 23 is generated or a time when the cycle signal of the first counter 12 or the second counter 13 is generated.

Comparative Example

When the compressibility is known for each music data in compressed audio data, a data rate of decoded data in a CD decoding process, a CD-ROM decoding process and a compressed audio data decoding process can be found. However, there is a variable bit rate method in which the data compressibility of a part of compressed audio data is not fixed but varies. Conventional examples cannot cope with the varying decoded data rate.

The conventional example will be described in which a line speed in read of an optical disc is given in advance. Data read out from an information recording disc 103 by an information recording disc reading apparatus 108 is influenced by a variation in the rotation of the disc. For this reason, the data cannot be fetched as it is while using a fixed clock signal. Generally, a bit clock signal which is phase-locked to the data by a PLL circuit is generated and the data is synchronized with the bit clock signal and decoded as digital data. It is assumed that the information recording disc reading apparatus 108 in the conventional example includes the PLL circuit for generating the bit clock signal phase locked to read data.

In the conventional technique, switching of the rotation of the information recording disc 103 is performed between a rotation speed Rc corresponding to a transfer rate to the host computer 101 and a low rotation speed Rc/N (for example, N=2, N is an optional fixed value) when a certain amount of data or more have been stored in the buffer 106 or when an error occurs a predetermined number of times or more in the decoding process.

In the binary switching of rotation speed, however, when a difference in speed at the switching of rotation speed is large, the phase-locked state of the PLL circuit for generating the bit clock signal to the read signal cannot be maintained and a normal clock generation cannot be achieved, so that there is a possibility that the data error rate may be large, while the rotation speed is largely varying. Further, when a time interval during which a reproduction speed is monitored is long, overflow/underflow of the buffer memory may occur during the decoding process. Furthermore, according to the conventional example, since a microprocessor carries out monitoring of a line speed and setting of a rotation speed in a disc rotation control, it is difficult to reduce loads imposed on the microprocessor.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. An optical disc reproducing apparatus comprising:

a decode processing circuit configured to generate decoded data by decoding encoded data read out from an optical disc such that the decoded data is written into a buffer memory, and to output a write signal to indicate a data rate when the decoded data is written in said buffer memory;

a data processing circuit configured to convert the decoded data read out from said buffer memory into output data, and to output a read signal to indicate a data rate when the decoded data is read out from said buffer memory; and an optical disc rotation control circuit configured to control a number of rotations of said optical disc based at least in part on the write signal and the read signal, wherein said optical disc rotation control circuit comprises:

a first counter configured to output a first counter value based on the write signal;

a second counter configured to output a second counter value based on the read signal;

a phase difference data calculating circuit configured to multiply predetermined fixed values with the first counter value and the second counter value, respectively, and to calculate a difference between the multiplication results;

an UP-DOWN counter configured to output a third counter value based on a number of cycles of said first counter and a number of cycles of said second counter;

a cycle difference data calculating circuit configured to calculate a difference of the number of cycles of said first counter and the number of cycles of said second counter based on the third counter value; and an adding circuit configured to add an output of said phase difference data calculating circuit and an output of said cycle difference data calculating circuit for calculation of a summation, wherein the number of rotations of said optical disc is controlled based at least in part on the summation.

2. The optical disc reproducing apparatus according to claim 1, wherein said first counter restarts a count operation from an initial count value when the first counter value reaches a maximum count value, and supplies a first cycle number indicating a number of times of the restart to said UP-DOWN counter, said second counter restarts a count operation from an initial count value when the second counter value reaches a maximum count value, and supplies a second cycle number indicating a number of times of the restart to said UP-DOWN counter, and said UP-DOWN counter generates a new third counter value by adding a predetermined value to the third counter value in response to the first cycle number, and generates a new third counter value by subtracting a predetermined value from the third counter value in response to the second cycle number.

3. An optical disc reproducing apparatus comprising:

a decode processing circuit configured to generate decoded data by decoding encoded data read out from an optical disc such that the decoded data is written into a buffer memory, and to output a write signal to indicate a data rate when the decoded data is written in said buffer memory;

a data processing circuit configured to convert the decoded data read out from said buffer memory into an output data, and to output a read signal to indicate a data rate when the decoded data is read out from said buffer memory; and an optical disc rotation control circuit configured to control a number of rotations of said optical disc based at least in part on the write signal and the read signal, wherein said optical disc rotation control circuit comprises:

a first counter configured to output a number of cycles of a first counter value which is calculated based on the write signal;

a second counter configured to output a number of cycles of a second counter value which is calculated based on the read signal; and an UP-DOWN counter configured to output a third counter value based on the number of cycles of said first counter and the number of cycles of said second counter, wherein the rotation of said optical disc is controlled based at least in part on a difference of the number of cycles of said first counter and the number of cycles of said second counter which difference is obtained based on the third counter value.

4. An operation method of an optical disc reproducing apparatus, comprising:

generating decoded data by decoding encoded data read out from an optical disc such that the decoded data is written into a buffer memory;

generating a write signal to indicate a data rate when the decoded data is written in said buffer memory;

converting the decoded data read out from said buffer memory into output data;

generating a read signal to indicate a data rate when the decoded data is read out from said buffer memory; and controlling a number of rotations of said optical disc based at least in part on the write signal and the read signal, wherein said controlling comprises:

generating a first counter value based on the write signal;

generating a second counter value based on the read signal;

multiplying predetermined fixed values with the first counter value and the second counter value, respectively, to calculate a phase difference between the multiplication results;

generating a third counter value based on a number of cycles of said first counter and a number of cycles of said second counter;

calculating a cycle difference of the number of cycles of said first counter and the number of cycles of said second counter based on the third counter value;

adding the phase difference and the cycle difference for calculation of a summation; and controlling the number of rotations of said optical disc based at least in part on the summation.

5. The operation method according to claim 4, further comprising:

generating a first cycle number indicating a number of times of restart while a count operation is restarted from an initial count value when the first counter value reaches a maximum count value;

generating a second cycle number indicating a number of times of restart while a count operation is restarted from an initial count value when the second counter value reaches a maximum count value;

generating a new third counter value by adding a predetermined value to the third counter value in response to the first cycle number; and generating a new third counter value by subtracting a predetermined value from the third counter value in response to the second cycle number.

6. An operation method of an optical disc reproducing apparatus, comprising:

generating decoded data by decoding encoded data read out from an optical disc such that the decoded data is written into a buffer memory;

generating a write signal to indicate a data rate when the decoded data is written in said buffer memory;

converting the decoded data read out from said buffer memory into output data;

generating a read signal to indicate a data rate when the decoded data is read out from said buffer memory; and controlling a number of rotations of said optical disc based at least in part on the write signal and the read signal, wherein said controlling comprises:

generating a number of cycles of a first counter value which is calculated based on the write signal;

generating a number of cycles of a second counter value which is calculated based on the read signal;

generating a third counter value based on the number of cycles of said first counter and the number of cycles of said second counter;

controlling the rotation of said optical disc based at least in part on a difference of the number of cycles of said first counter and the number of cycles of said second counter which difference is obtained based on the third counter value.

7. An operation method of an optical disc reproducing apparatus which comprises a decode processing circuit configured to generate decoded data by decoding encoded data read out from an optical disc to supply the decoded data into a buffer memory; a data processing circuit configured to convert the decoded data read out from said buffer memory into an output data and an optical disc rotation control circuit configured to control a number of rotations of said optical disc, said operation method comprising:

said decode processing circuit generating a write signal to indicate a data rate when the writes the decoded data is written in said buffer memory;

said data processing circuit generating a read signal to indicate a data rate when the decoded data is read out from said buffer memory; and said optical disc rotation control circuit controlling a number of rotations of said optical disc based on the write signal and the read signal, wherein said controlling comprises:

outputting the number of cycles of a first counter value which is calculated based on the write signal;

outputting the number of cycles of a second counter value which is calculated based on the read signal;

outputting a third counter value based on the number of cycles of the first counter and the number of cycles of the second counter.

* * * * *